W. THOMPSON.
Lathe Rest.
No. 79,877. Patented July 14, 1868.
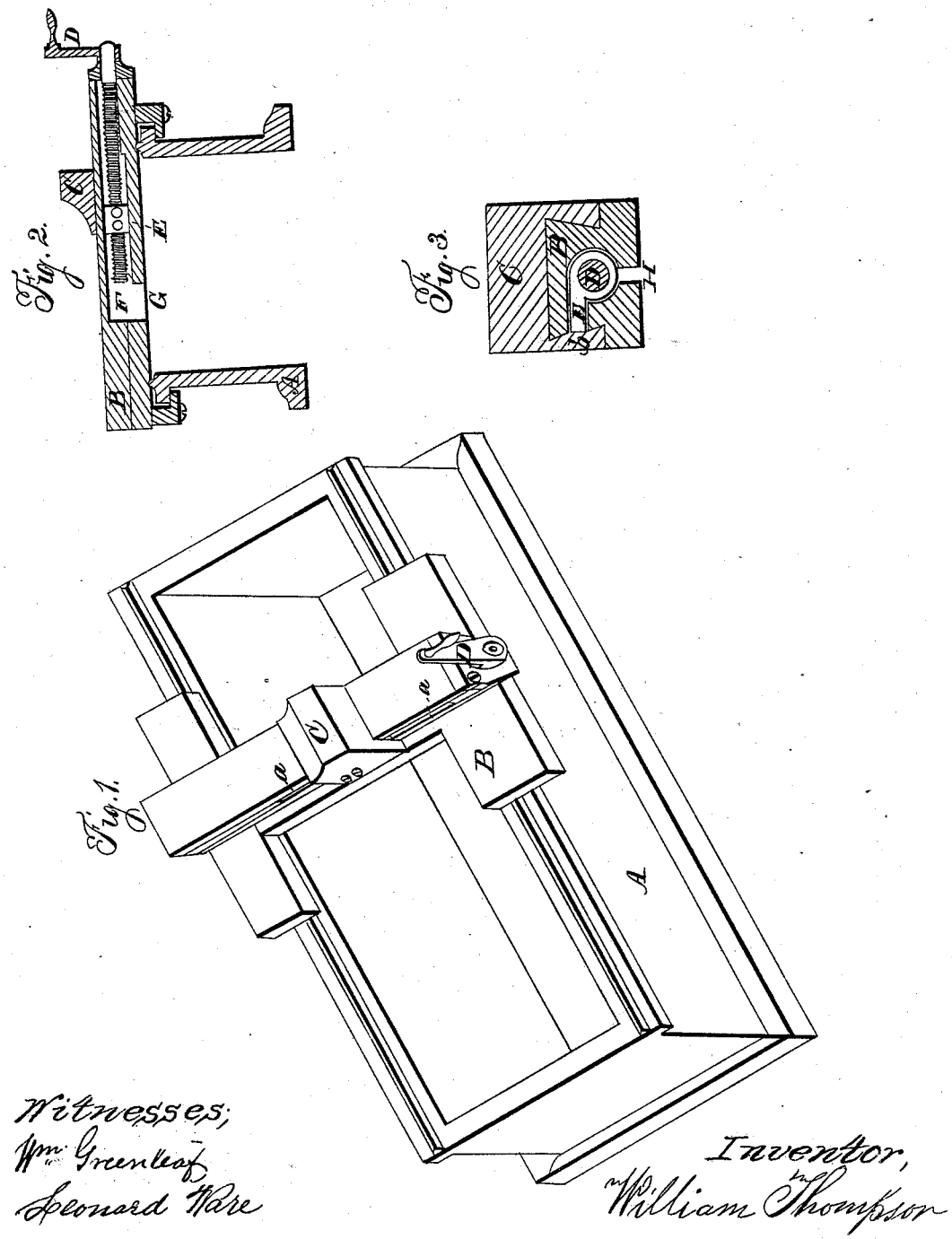
Witnesses;
Wm Greenleaf
Leonard Ware
Inventor,
William Thompson

United States Patent Office.

WILLIAM THOMPSON, OF WORCESTER, MASSACHUSETTS.

Letters Patent No. 79,877, dated July 14, 1868.

IMPROVEMENT IN LATHE-RESTS.

The Schedule referred to in these Letters Patent and making part of the same.

TO WHOM IT MAY CONCERN:

Be it known that I, WILLIAM THOMPSON, of the city and county of Worcester, and State of Massachusetts, have invented new and useful Improvements in Engine-Turning-Lathe Rests; and I do hereby declare that the following is a full, clear, and exact description of the same, reference being had to the annexed drawings, making a part of this specification, the same letters in the several figures denoting the same part.

Figure 1 is a perspective view of a lathe-bed with the rest and poppet-block.

Figure 2 is a sectional longitudinal view of the rest through the screw-chamber.

Figure 3 is a transverse section of the rest cut through the poppet-block.

A is the lathe-bed.

B is the sliding rest.

C is the poppet-block, which slides upon the rest B.

D is the crank of the screw which moves the block C.

E is the nut in which the screw operates, and is attached to the poppet-block C at $b$.

$a$ is a slot through the side of the rest B to the screw-chamber F, through which the arm of the nut E passes to connect with the poppet-block.

G is an opening in the under side of the rest B, to admit the nut E into the chamber F.

H is a slot in the under side of the rest B, to allow all dirt to escape from the screw-chamber F.

The advantage of attaching the nut E to the poppet-block C through the side of the rest B, instead of through the top, as is usually done, is, it avoids the vast amount of dirt and chips with which the screw-chamber is usually filled, and the consequent rapid wear of the screw.

That which I claim as my invention, and desire to secure by Letters Patent, is—

Connecting the nut E to the poppet-block C by means of a screw passing through a slot in the side of the rest B, in the manner herein described.

WILLIAM THOMPSON.

Witnesses:
WM. GREENLEAF,
LEONARD WARE.